United States Patent
Ponsford et al.

(10) Patent No.: US 10,281,573 B1
(45) Date of Patent: May 7, 2019

(54) RETRODICTION TRACKING SYSTEM AND RELATED TECHNIQUES

(71) Applicant: Raytheon Canada Limited, Ottawa (CA)

(72) Inventors: Anthony M. Ponsford, Ottawa (CA); Derek Yee, Milton (CA); Richard McKerracher, Waterloo (CA)

(73) Assignee: RAYTHEON CANADA LIMITED, Ottawa (CA)

( * ) Notice: Subject to any disclaimer, the term of this patent is extended or adjusted under 35 U.S.C. 154(b) by 841 days.

(21) Appl. No.: 14/281,025

(22) Filed: May 19, 2014

(51) Int. Cl.
*G01S 13/66* (2006.01)
*G01S 7/28* (2006.01)

(52) U.S. Cl.
CPC .............. *G01S 13/66* (2013.01); *G01S 7/28* (2013.01)

(58) Field of Classification Search
CPC ..................................... G01S 7/28; G01S 13/66
See application file for complete search history.

(56) References Cited

U.S. PATENT DOCUMENTS

| | | | | |
|---|---|---|---|---|
| 3,699,573 A * | 10/1972 | Andrews | ............. | G01S 13/72 342/189 |
| 7,026,979 B2 * | 4/2006 | Khosla | ............. | G01S 13/726 342/140 |
| 7,626,535 B2 | 12/2009 | Ding et al. | | |
| 7,929,374 B1 * | 4/2011 | Grimmett | ............. | G01S 7/003 367/98 |
| 8,294,609 B2 * | 10/2012 | Graham | ............. | G01S 7/412 342/90 |

OTHER PUBLICATIONS

Mellema, "Reverse-Time Tracking to Enhance Passive Sonar", Defence R & D Canada—Atlantic, 8 pages.
Koch, "Retrodiction for Bayesian Multiple Hypothesis/Multiple Target Tracking in Densely Cluttered Environment", Wachtberg, Germany; SPIE vol. 2759/429, 12 pages.
Krishnan, Krishanth MR, "Prediction, Tracking and Retrodiction for Path-Constrained Targets" (2012) *Open Access Dissertations and Theses*. Paper 7336, McMaster University, 82 pages.
Ding, "Track Retrodiction for HFSWR" Technical Memorandum, Defence R & D Canada—Ottawa (Dec. 2011), 32 pages.

* cited by examiner

*Primary Examiner* — Regis J Betsch
(74) *Attorney, Agent, or Firm* — Daly Crowley Mofford & Durkee LLP

(57) ABSTRACT

A retrodiction tracker and related techniques and system are described. The technique extends the track range of an inbound target, initially detected with a low signal-to-noise ratio (SNR) (or initially detected with signals having a low probability of detection) to that of an outbound target where the low SNR detection is being associated with a confirmed, established, track. Retrodiction and backward propagation are being combined with historical plot-to-track association to significantly enhance the tracking capability of a radar.

20 Claims, 10 Drawing Sheets

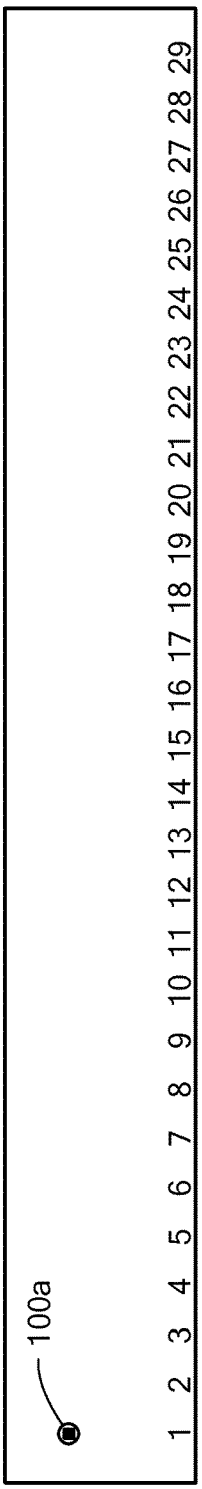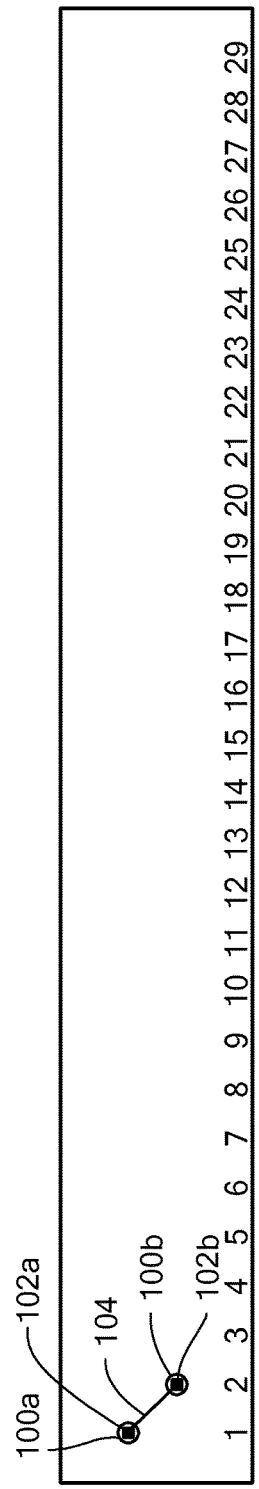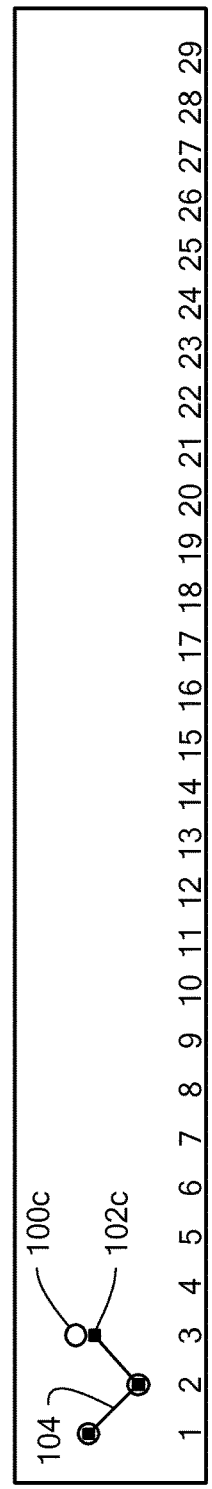

RETRODICTION TRACKING SYSTEM AND RELATED TECHNIQUES

BACKGROUND

As is known in the art, in tracking radars such as high frequency surface wave radar (HFSWR), performance is specified in terms of track range. Track ranges are greater for outbound targets than inbound targets. For inbound targets, track initiation is undertaken on signals having a low probability of detection (Pd). Consequently, track errors will also be greater. Frequency hopping, as being developed for next generation HFSWR, will compound the problem of track initiation for low probability of detection (Pd) signals.

As is also known, track retrodiction is a method applied to provide a more historical accurate estimate of a target's position. Track retrodiction techniques can be useful in track/motion forensic analysis particularly when associating data from multiple systems. Retrodiction techniques can be combined with track-to-track association to implement so-called "track stitching" which can be viewed as extending (or "stitching" a new track back into the past). Conventional retrodiction techniques do not associate detections prior to the initiation of the original track.

So-called "track-before-detect" techniques include those techniques in which a signal is tracked before declaring it a target. In such approaches, data about a tentative target are integrated over time and may yield detection in cases when signals from any particular time instance are too weak against clutter (low signal-to-noise ratio) to register a detected target.

SUMMARY

While in the past, Wide Area Surveillance (WAS) systems have typically provide last known position reports, current state of the art operators of WAS systems have a preference for high quality track data for predictive assessment of intent based upon forensic motion analysis. To achieve this, operators of WAS systems are prepared to have delayed notification of the presence of a potential target. Thus, to meet the requirement of providing high quality track data for predictive assessment of intent, retrodictive filtering has been added to reduce the errors associated with track initiation of targets.

In accordance with the concepts, techniques and system described herein, it has been recognized that associating detections prior to the initiation of an original track can be a significant benefit when tracking a target.

The system and technique described herein extends the aforementioned retrodictive filtering technique by using reverse time (retrodiction) to extend the track range of a radar. The technique extends the track range of an inbound target, initially detected with a low signal-to-noise ratio (SNR) (or initially detected with signals having a low probability of detection) to that of an outbound target where the low SNR detection is being associated with a confirmed, established, track. Thus, as described herein, retrodiction and backward propagation are being combined with plot-to-track association to significantly enhance the tracking capability of a radar.

In accordance with the concepts sought be protected, it has been recognized that associating detections prior to the initiation of the original track can be a significant benefit. Such an approach could be particularly useful when associating data from multiple systems.

Described herein is a system and technique which allows the whereabouts of a target to be determined prior to a track being initiated. The proposed systems and techniques are significantly less complex than track-before-detect techniques and can be viewed as systems and techniques which provide an extension of a vessel's track back in time to before the initial track was established.

Retrodiction tracking allows an operator to be presented with a more accurate representation of a vessel's track plus the extension of that track further back in time. This can be critical in correlating other system data as well as the characterization of the vessel and determination of its intended action (forensic motion analysis). Furthermore, system sell-off of tracking radar systems is by track range and not detection range. Retrodiction tracking can significantly extend the range at which tracks are initiated.

A tracker associates time-consecutive plots that lie within a locality of a predicted future position of a previous detection or track. As more detections are associated the track errors become less. As described herein, retrodiction tracking reverses this process and associates in past plots to an established track to both: (1) reduce (and ideally minimize) the errors associated with the early stages of tracking; and (2) to extend the track back in time.

Retrodiction Tracking addresses the issue of Track Accuracy by Reprocessing past data based upon Current Track Data. Specifically, to reduce (or ideally minimize) false track rates, a deferred decision tracker is used, where the tracker employs three levels of track promotion logic:

(1) Potential tracks (P): Each non-associated single detection is potentially a new track;
(2) Tentative tracks (T): Track is classified as tentative until a predetermined number detections have been associated; and
(3) Confirmed tracks (C): Track is classified as confirmed and appears on the display after a defined number of associated detections.

The probability of track is defined as the likelihood that a vessel detected with a given probability of detection (Pd) forms a confirmed track. The probability of confirmed track is dependent on the probability of detection Pd and the track promotion logic. At low probability of detection values, a large number of updates can be required to reach a level of confirmed track and a tentative track may be deleted prior to this stage being met. Thus, retrodiction tracking addresses the issue of early track initiation for low probability of detection Pd signals coupled with low false track rate by reverse time tracking.

BRIEF DESCRIPTION OF THE DRAWINGS

The foregoing and other objects, features and advantages of the concepts, systems and techniques described herein will be apparent from the following description of particular embodiments, as illustrated in the accompanying drawings in which like reference characters refer to the same elements throughout the different views. The drawings are not necessarily to scale, emphasis instead being placed upon illustrating the principles of the concepts, systems, circuits and techniques for which protection is sought.

DETAILED DESCRIPTION

Before describing the processing to be performed by and in radar and other tracking systems, it should be appreciated that, in an effort to promote clarity, reference is sometimes made herein to a particular type of radar—i.e. high frequency surface wave (HFSW) radar. Such reference should not be taken as limiting the systems and techniques described herein to use with only HFSW radar. Rather, the systems and techniques described herein find application in any type of tacking radar or in command and control (C2) systems or command, control and communication (C3) systems. Accordingly, those of ordinary skill in the art will appreciate that the description and processing described herein may occur in any type of radar or other system in which tracking may be useful.

As used herein, the term "module" encompasses elements which may be implemented in either hardware (e.g. circuits, circuit elements and circuit components), software (e.g. computer coded being executed by a processor), and/or firmware or which may be implemented with any combination of hardware, software and/or firmware.

Figure 1:
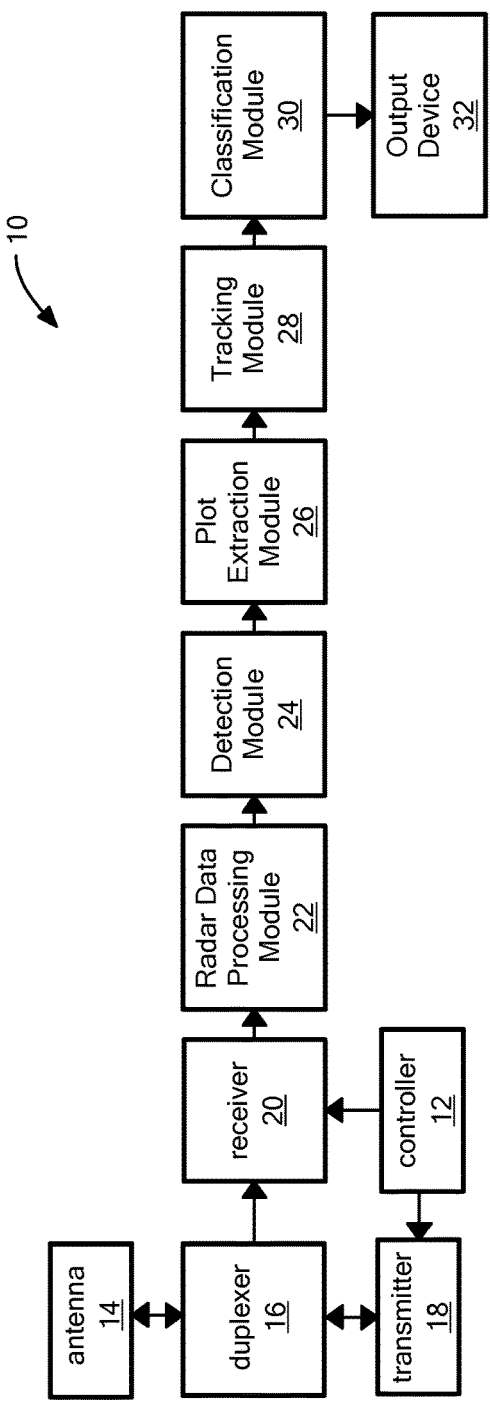
FIG. 1 is a block diagram of a radar tracker system which utilizes a tracking module, the tracking module using retrodiction tracking techniques.

Referring now to FIG. 1, a radar system 10 includes a controller 12, an antenna 14, a duplexer 16, a transmitter 18, and a receiver 20. The radar system 10 further includes radar data processing module 22, a detection module 24, a plot extraction module 26, a tracking module 28, a classification module 30, and an output device 32. In alternative embodiments, the radar system 10 may have a different layout or configuration, including different components, as is commonly known by those skilled in the art. For example, the classification module 30 may be additionally, or optionally, connected to at least one of the detection module 24 and the plot extraction module 26 to classify detected targets. This allows target classification to be done at various stages of target tracking including during or after detection, plot extraction or track formation. In alternative embodiments, there may also be an input module (not shown) that can be used to provide an additional level of control to the radar system 10. Also, the system can employ separate transmit and receive antenna, in which case the duplexer may not be required.

The controller 12 controls the activity of the radar system 10 and although connections are shown only to the transmitter 18 and the receiver 20, it is understood that the controller 12 can provide control signals to other components of the radar system 10. In general, the controller 12 provides control signals to the transmitter 18 for generating radar pulses to be transmitted via the antenna 14. The controller 12 also provides control signals to the receiver 20 for receiving return radar signals due to reflections of the transmitted radar pulses. The controller 12 can also control the duplexer 16 to allow either the transmitter 18 or the receiver 20 to be connected to the antenna 14 for transmitting or receiving signals. The controller 12 can then direct the activities of the remaining components of the radar system 10 to process the received return radar signals and provide information on any detected targets. It should be appreciated that although the controller 12 is depicted as an entity separated from the transmitter and receiver, in some systems the circuits, which provide the controller function are provided as part of the transmitter and/or receiver and timing and control signals are directly coupled between the transmitter and receiver.

The radar system 10 can employ any suitable type of antenna 14, duplexer 16, and transmitter 18 known to those skilled in the art. The antenna 14 can be a scanning antenna, a phased array antenna, or any other suitable antenna. The transmitter 18 can be a solid-state transmitter, a tube transmitter, or any other suitable transmitter. Various waveforms can be used for generating the transmitted radar pulses such as simple unmodulated waveforms, modulated complex waveforms such as nonlinear FM waveforms as well as other suitable waveforms transmitted in a simplex frequency, dual frequency, or other suitable fashion as is commonly known by those skilled in the art. A variable pulse repetition frequency (PRF) may also be used across different coherent processing intervals (CPIs) to combat the blind speed problem, which is known to those skilled in the art. Alternatively, a constant PRF across different CPIs may also be used.

After the radar pulses are transmitted by the transmitter 18, the return radar signals (i.e. reflections of the transmitted radar pulses) are received by the antenna 14 and processed by the receiver 20. The receiver 20 typically includes analog and digital circuitry, such as one or more filters, amplifiers, and mixers; and an analog to digital converter. These elements perform filtering, amplification, down-conversion (i.e. demodulation to a lower frequency band) and provide pre-processed digital radar data as is commonly known by those skilled in the art. Filtering removes extraneous unwanted signals in the return radar signals. In some cases, heterodyning can be used to demodulate the filtered data from the radio frequency (RF) band to an intermediate frequency (IF) band where analog to digital conversion can take place.

The radar data processing module 22 is typically implemented using a digital signal processor, as can several of the other components shown in FIG. 1. The radar data processing module 22 further processes the pre-processed digital radar data to generally provide range-Doppler-azimuth radar data. The processing performed by the radar data processing module 22 depends upon the hardware associated with the radar system 10. Generally, the radar data processing module 22 can perform demodulation to the baseband, low-pass filtering and downsampling. In one implementation, the radar data processing module 22 performs matched filtering by employing one or more matched filters that have a transfer function or impulse response that is matched to the transmitted radar pulses. The data from the matched filter(s) is then separated into CPIs for analysis in which the data is range-aligned and beamformed to provide the range-azimuth data. The range information in the range-azimuth data provides an estimate of a possible target's distance from the radar system 10. The azimuth information in the range-azimuth data provides an estimate of the angle of the possible target's location with respect to the center of the antenna 14. The radar data processing module 22 can then apply Doppler filtering to the range-azimuth data to produce range-Doppler-azimuth data. The Doppler information in the range-Doppler-azimuth data provides an estimate of a possible target's radial velocity by measuring the possible target's Doppler shift, which is related to the change in frequency content of a given radar pulse that is reflected by the possible target with respect to the original frequency content of the given radar pulse. Those skilled in the art are generally familiar with the processing performed by the radar data processing module 22, the order in which the different stages of the processing can be performed, as well as how these different stages of processing can be implemented. It may not be necessary to perform each of these stages of processing, since one or more of these operations may be performed by different modules to enhance performance, e.g. the detection module 24 can implement a certain method to enhance detection. In other words, the radar data processing module 22 processes the pre-processed radar data to provide radar data that is typically some combination of range, azimuth and Doppler data.

The detection module 24 then locates candidate targets from the radar data provided by the radar data processing module 22. Various techniques can be used for detection as is commonly known by those skilled in the art. For instance, various types of constant false alarm rate (CFAR) techniques can be used. Further noise reduction may be performed by the detection module 24 to enhance detection, which can include the application of clutter maps to reduce the effect of clutter. In at least some cases, one or a combination of binary integration and video integration can also be used. Second time around target suppression can also be used.

The plot extraction module 26 receives and combines the candidate detections to form plots through a process known as plot extraction. The plot extraction module 26 filters the candidate targets to reject all of those candidate targets that do not conform to the certain values that are expected for certain properties of a particular type of target such as, but not limited to, aircraft targets.

The tracking module 28 receives plot information from the plot extraction module 26. The plot information may include digital representations of one more plots and may be provided as a stream of digital bits. The tracking module 28 uses the plot information to generate tracks by accounting for the temporal variation of measurement information for candidate targets for a sequence of plots. Whereas a conventional tracker associates time-consecutive plots that lie within a locality of a predicted future position of a previous detection, the tracking module 28 additionally uses a retrodiction filter to reduce (and ideally minimize) errors associated with the earlier stages of tracking; thus, the tracking module 28 may perform a conventional forward plot-to-track association, in addition to a reverse filtering process. It will be understood that, retrodiction does not invoke plot-to-track association in providing an improved (i.e. more accurate) track estimate, but rather it comprises a backward iteration operating on the quantities computed in the forward filtering process. Moreover, additional techniques can be used in conjunction with retrodiction tracking to further improve track quality. For example, the tracking module 28 may use reverse time tracking techniques (e.g. historical plot-to-track association and the corresponding measurement update) to extend a track back in time. The tracking module 28 may also use tracking stitching techniques to further improve track quality. Generally, the tracking module 28 determines the movement of the candidate targets through a given surveillance area and uses a retrodiction tracking technique (and optionally other techniques in some embodiments) to improve the quality of tracks.

As noted above and as will be described in detail in conjunction with FIGS. 2-4, tracking module 28 extends the aforementioned retrodictive filtering technique by using reverse time tracking to extend the track range of radar 10 back in time. Tracking module 28 may perform processing which extends the track range of an inbound target, initially detected with a low SNR (or initially detected with signals having a low probability of detection) to that of an outbound target where the low SNR detection is being associated with a confirmed, established, track. Thus, as described herein, retrodiction used in combination with backward propagation and historical plot-to-track association (i.e., reverse time tracking) significantly enhances the tracking capability of a radar. An example of a tracking module 28 is shown in FIG. 2 and described in more detail below in connection therewith.

The classification module 30 receives the tracks generated by the tracking module 28 and analyzes the tracks by measuring values for certain features of the tracks in order to classify the tracks as belonging to various different categories such as aircraft, birds, ground and weather clutter, environmental or geographical interference, etc. Another classifier may be trained for particular aircraft or non-aircraft targets and applied to the output of the classification module 30 to extract particular targets from aircraft or non-aircraft outputs. For instance, the non-aircraft class can be expanded to include birds, windmills, AP, etc. The aircraft class can be expanded to include helicopters, unmanned aerial vehicles (UAV), light aircrafts, etc. Alternatively, the classification module 30 may be trained to identify each of these sub-classes of the aircraft and non-aircraft classes.

The output device 32 can provide information on the targets that are being tracked by the radar system 10. The output device 30 can be a monitor, a printer, or other suitable output means. The output device 32 can receive classified tracks from the classification module 30 and provide output information on the classified tracks. In other embodiments, the output device 32 can receive information from other components of the radar system 10 and output this information.

Figure 2:
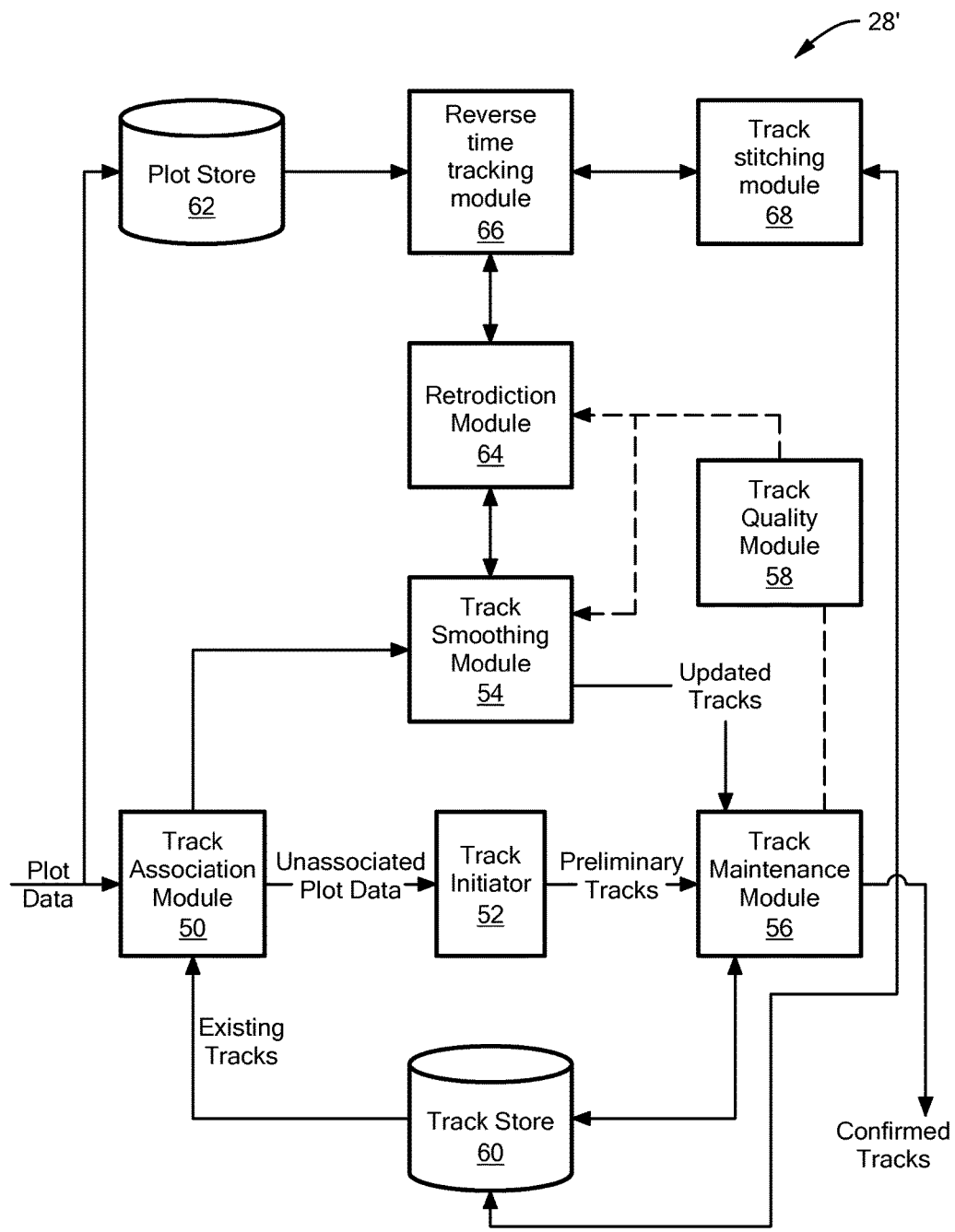
FIG. 2 is a block diagram of a tracking module of the type which may be used in the system of FIG. 1.

Referring now to FIG. 2, a tracking module 28', which may be the same as or similar to tracking module 28 in FIG. 1, includes a track association module 50, a track initiator 52, a track smoothing module 54, a track list maintenance module 56, and a track quality module 58. The tracking module 28' may further include a track store 60, a plot store 62, a retrodiction module 64, a reverse time tracking module 66, and a track stitching module 68.

In general operation, the tracking module 28' uses an assignment-based method for data association (i.e. associating measurements to tracks) and calculates a track quality measure for the tracks that is used in track maintenance. The tracking module 28' incorporates measurement-to-track association likelihoods in the track quality measure by considering the possible detection events in whether or not the corresponding track is updated at the current time step. Generally, the likelihoods incorporate the target detection probability for a given sensor-target geometry and a corresponding false alarm density. In general, measurement-to-track association likelihood, and hence the track quality, is relatively small for false tracks compared to true tracks, and therefore aids in discriminating true tracks from false tracks.

The track association module 50 receives plot data (i.e. measurements) from the plot extraction module 26 (FIG. 1) and attempts to associate particular plots with existing tracks. In some embodiments, the existing track information is maintained in a track store 60, as shown. A particular plot can be associated with zero or more existing tracks. Before the associations are made, the module 50 may propagate all of the existing tracks to the current time by predicting their new position based on the most recent state estimate (e.g. position, heading, speed, acceleration, etc.) and the assumed target motion model (e.g. constant velocity, constant acceleration, etc.). Having propagated the estimates, the track association module 50 can apply one or more techniques to associate the plots to existing tracks. Various plot-to-track association techniques are known to those skilled in the art, and any suitable technique can be used herein. For example, for each existing track, the module 50 may determine a region around a track's estimated position and associate plots within that region to that track; such a region can be based on measurement errors and errors in prediction. Associated plot-to-track information is sent to the track smoothing module 54, whereas unassociated plot data is sent to the track initiator 52.

In some embodiments, the track association module 50 associates measurements to the current tracks and generates the measurement association statistics. The measurement association statistics include information related on the association of measurements to a particular track. For instance, for a given track, the measurement association statistics can include the number of measurement associations for the track, the number of consecutive non-associations for the track (i.e. the number of consecutive time steps during which no association is made), and the like. The number of consecutive non-associations is calculated until the track is next associated with a measurement or the track is deleted.

To mitigate the problem of associating measurements from other targets and/or false measurements with a given track, the tracking module 28' may group tracks into different lists and associate them with measurements in a particular order. The tracks are grouped into the different lists based upon their track quality and measurement association statistics (e.g. the number of consecutive non-associations and the total number of updates). The lists include a list of initial tracks, a list of confirmed tracks, and a list of unobservable tracks. The confirmed tracks are associated with measurements first. Next, the unobservable tracks, which are typically tracks having a higher number of consecutive non-associations, but are still retained, are associated with the remaining measurements. Finally, the initial tracks are associated with the remaining measurements. To reduce the possibility of false measurement associations with unobservable tracks, the associations can be made only after the unobservable track is associated with a certain number of measurements. In one embodiment, the track association module 50 uses stricter plot-to-track association criteria for tracks in the unobservable tracks list.

The track initiator 52 receives unassociated plot data (i.e. plot data not associated with any existing track) of candidate targets from the track association module 50 and generates one or more preliminary tracks. The preliminary tracks are sent to the track list maintenance module 56 and can be added to the list of initial tracks.

The track smoothing module 54 improves one or more existing tracks using the newly associated plot data from the track association module 50. The latest track prediction is combined with the associated plots to provide a new, improved estimate of the target state as well as a revised estimate of the errors in prediction. Any suitable smoothing technique can be used, including Kalman filtering, interacting multiple model (IMM) filtering, and other techniques known to those skilled in the art.

In addition to using known smoothing techniques, the tracking module 28' further improves track quality using retrodiction tracking techniques, which may be implemented within the retrodiction module 64. The track smoothing module 54 can invoke the retrodiction processing once a track reaches a certain quality (as determined, for example, by the track quality module 58). Although a more detailed description of the retrodiction processing is described below in conjunction with FIGS. 3 and 3A, a brief overview is given herein. Generally, the retrodiction processing utilizes all of the observations/measurements/information collected from time t=0 to the current time t>0 and it uses that information to refine (i.e., update) all past estimates through a backward iteration that acts on the quantities calculated during forward filtering. Forward filtering can be based upon any technique that calculates a set of requisite states and covariances, such as Kalman filtering or IMM filtering.

In some embodiments, the tracker may perform reverse time tracking (e.g. within the reverse time tracking module 66) to extend tracks back in time (i.e. to times t<0). In addition to further improving track quality, reverse time tracking also enables forensic analysis. In general, the reverse time tracking module 66 performs plot-to-track association using historical plot data stored, for example, in a plot store 62. The tracking module 28' may also include a tracking stitching module 68 to combine multiple tracks into a single track, thereby reducing discontinuities ("breakages") within the track and improving overall continuity in the instrumented coverage area. In one embodiment, the retrodiction module 64 first improves estimates back to time t=0 to thus provide an improved track. Then, taking advantage of the improved estimate at time t=0, the reverse time tracking module 66 extends the improved track back in time (i.e. an earlier time t<0). It will be appreciated that the successful application of reverse time tracking depends on the accuracy of the estimate at time t=0 and, thus, the refinement provided by retrodiction is particularly important within high clutter environments, where the initial portion of the track may include one or more clutter plots.

Next, the track stitching module 68 may combine tracks which belong to the same target, thereby, eliminating redundant tracks and improving track continuity. In sum, the retrodiction module 64, the reverse time tracking module 66, and the track stitching module 68 collectively operate to improve, extend, and combine existing tracks within the tracking module 28'.

The track maintenance module 56 generally maintains one or more lists of tracks, adding and removing tracks based on several criteria. As discussed above, the tracker includes a list of initial tracks, a list of confirmed tracks, and a list of unobservable tracks. The track maintenance module 56 may receive preliminary tracks from the track initiator 52 and updated existing tracks from the track smoothing module 54, as shown. In some embodiments, the track maintenance module 56 stores tracks and/or track lists in a track store 60, which is also accessible to the track association module 50.

The track maintenance module 56 uses various rules for separating tracks into various lists, moving tracks between these lists, and terminating tracks from these lists. These rules are based, at least in part, on the track quality of the tracks, and measurement association statistics, which can include a number of consecutive non-associations and a total number of updates. Initially, all tracks can be placed in the list of initial tracks. Each of the track lists can be updated separately. In some embodiments, the tracking module 28' includes a track quality module 58 which the track maintenance module 56 uses to determine the quality of a track. The track maintenance module can be configured to confirm a track with a higher track quality faster, and to retain such a track longer when there are no measurements that are associated with the track over a number of successive time slots (i.e. scans).

One difficulty with retaining an unobservable track is that its region of uncertainty increases as the sampling time increases. This may lead to associations of an unobservable track with measurements from the other targets and/or false measurements. To avoid such a situation, tracks with a high value of track quality, which have not been associated with a measurement for more than $n_{na}$ scans, are moved to the group of unobservable tracks. The tracks in this list are given lower precedence than confirmed tracks during plot-to-track association (e.g. within the track association module 50). However, an unobservable track can be moved back to the set of confirmed tracks if it is associated with $n_a$ measurements after it was first moved to the list of unobservable tracks and maintained a certain level of track quality while it was in the list of unobservable tracks.

The track quality module 58 is configured to calculate the quality of tracks. Any suitable measure can be used to determine track quality. For example, track quality may be higher if the track is more frequently associated with measurements and if it has higher measurement association likelihood values, which are relatively high compared with measurement association likelihood values of other tracks.

The tracking module 28' can provide each list of tracks along with associated information to the classification module 30 (FIG. 1). Alternatively, the tracking module 28' may provide only the list of confirmed tracks to the classification module 30.

Figures 3, 3A:
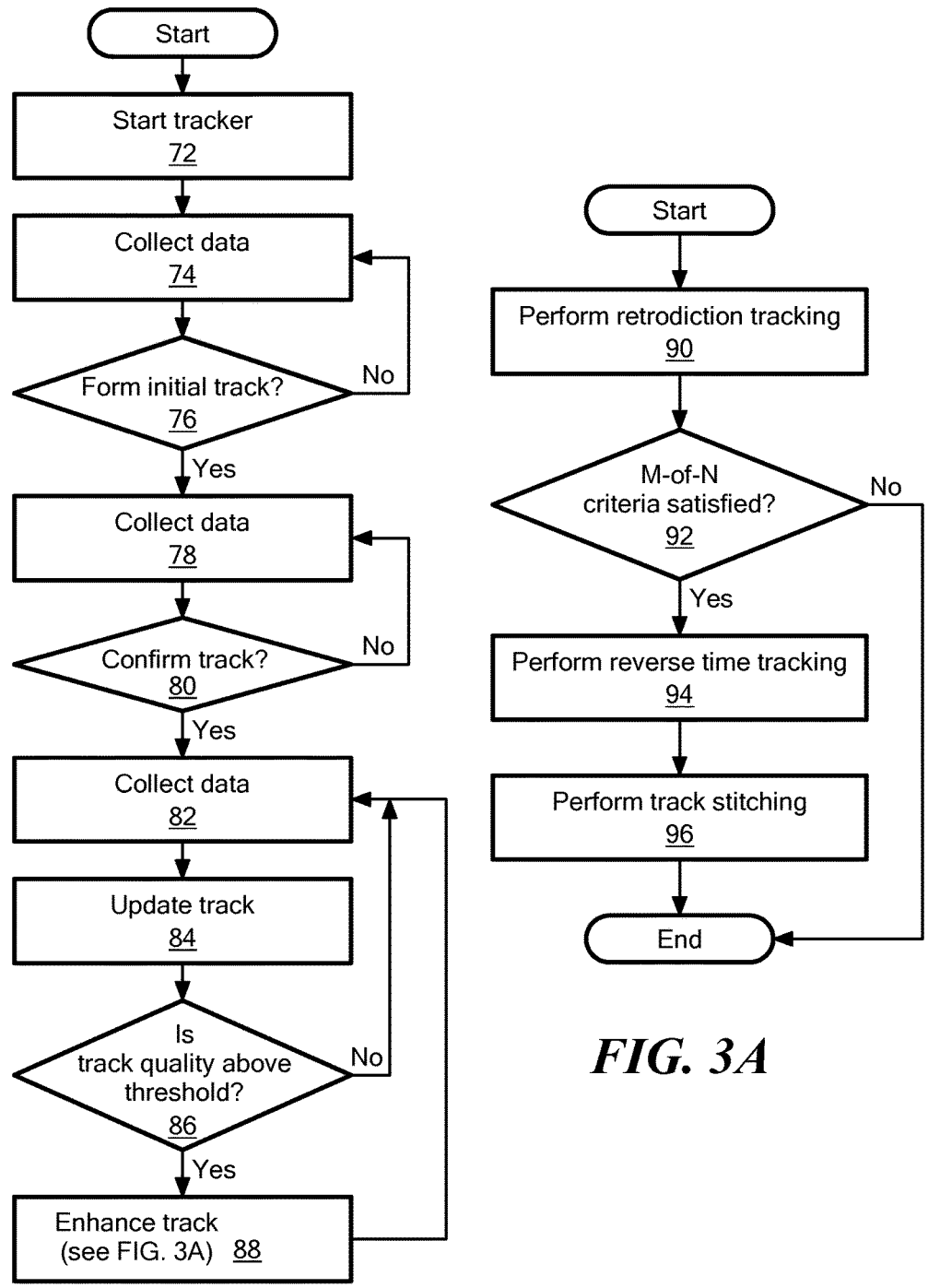
FIGS. 3 and 3A are flow diagrams which illustrate the operation of a retrodiction tracker of the type which may be used in the system of FIG. 1 or 2.

FIGS. 3 and 3A are flow diagrams showing the processing performed by a processing apparatus included in a system (such as the radar system described in conjunction with FIG. 1 or other system having a tracking capability) to compute target tracks. In particular, the processing may be performed by a tracker such as the retrodiction tracker described above in conjunction with FIGS. 1 and 2.

The rectangular elements (typified by element 72 in FIG. 3), are herein denoted "processing blocks," and represent computer software instructions or groups of instructions. The diamond shaped elements (typified by element 76 in FIG. 3), are herein denoted "decision blocks," and represent computer software instructions, or groups of instructions which affect the execution of the computer software instructions represented by the processing blocks.

Alternatively, the processing and decision blocks represent processes or steps performed by functionally equivalent circuits such as one or more digital signal processor circuits or one or more application specific integrated circuits (ASICs). The flow diagrams do not depict the syntax of any particular programming language. Rather, the flow diagrams illustrate the functional information one of ordinary skill in the art requires to fabricate circuits or to generate computer software to perform the processing required of the particular apparatus. It should be noted that many routine program elements, such as initialization of loops and variables and the use of temporary variables are not shown. It will be appreciated by those of ordinary skill in the art that, unless otherwise indicated herein, the particular sequence of elements or processes or steps described is illustrative only and can be varied without departing from the spirit of the concepts, systems and techniques described herein.

Turning now to FIG. 3, processing begins in processing blocks 72 and 74 in which the tracker starts and begins collecting data. As illustrated in decision block 76, the tracker collects sufficient data (i.e., plots) to form an initial (or "preliminary") track. For example, the tracker may require at least two associated plots to form a preliminary track. The tracker forms the initial track, and performs plot-to-track association, using any standard or conventional techniques known to those of ordinary skill in the art. After an initial track is formed, the tracker continues to collect data (block 78) until, at decision block 80, enough data is collected to promote the initial track to a "confirmed" track using standard or convention techniques known in the art. For example, the track may require a track to have at least a certain number (e.g., four) associated plots before it is confirmed. As data continues to be collected (block 82), the confirmed track is updated (block 84) using, for example, a standard tracking procedure under which a measurement is taken at current scan, a plot-to-track association is formed and the track is updated; this procedure is repeated as time increases. Because the tracker uses standard or conventional techniques to form and update the initial and confirmed tracks, these tracks are referred to herein as a "standard" or "conventional" tracks.

As the track is updated with new data, the system determines and maintains a track quality for each standard track that is formed. Track quality can be calculated using techniques described above in conjunction with the track quality module 58 of FIG. 2. Also, as indicated in decision block 86, once the standard track reaches a certain quality, then a decision is made to subject the track to enhancements. Such track enhancements, which are generally represented by processing block 88, are described below in conjunction with FIG. 3A. In general, the processing of blocks 82-88 is repeated many times for each confirmed track. It should be understood that the tracker may perform additional processing not shown in FIG. 3. For example, in some embodiments (as illustrated FIGS. 4A-4U), the tracker "deletes" (e.g., moves tracks to a list of deleted tracks) after a certain number of consecutive non-associations.

FIG. 3A is a flowchart showing track enhancement techniques that can be used within a retrodiction tracker. It should be appreciated that the processing shown in FIG. 3A corresponds to processing block 88 of FIG. 3. In processing block 90, retrodiction processing (e.g. IMM retrodiction) is applied to confirmed tracks which exceed a certain quality threshold. The retrodiction utilizes all of the observations/ measurements/information collected from time t=0 to the current time t>0 and it uses that information to refine all past estimates (i.e. all past estimates which form the track).

For example, (in the most extreme case) assume the tracking system identifies a target having an initial position that is generated when forming the standard track at time t=0. The standard track is initially updated using conventional tracking techniques. Once a the track is deemed to have a threshold track quality, however, retrodiction tracking is applied and all of the information collected from time t=0 to time t=N (e.g. the current time) is used to refine the "initial" position estimate at time t=0 (i.e. with the "initial position estimate" being the position estimate identified at time t=0 when the standard track was formed). By more accurately identifying the initial positional estimate, the track can be revised and a more accurate track can be formed.

Similarly, this can be done at time t=1, t=2, etc. Thus, "future" information (e.g. information collected at time t=1, t=2, etc. . . . ) can be used to refine a positional estimate at an earlier point in time (e.g. at time t=0).

In decision block 92, the tracker determines if reverse time tracking should be performed using an "M-of-N" criterion, whereby M is a number of historical associations to be made within N scans of historical plot data. For example, if M=1 and N=3, the tracker requires one historical association in the previous three scans of historical plot data (i.e., t=-3, t=-2, t=-1) to declare an initial reverse time track. If the M-of-N criterion is satisfied, the tracker proceeds with reverse time tracking and process all the historical data in the plot store (e.g., from t=−4 to some point in the past). In addition, after performing reverse time tracking, the tracker may perform track stitching. Otherwise, if the M-of-N criterion is not satisfied, the tracker performs neither reverse time tracking nor track stitching.

In processing block 94, reverse time tracking may be performed on the improved track to extend it back it time (e.g. to times t<0). In some embodiments, processing block 92 includes performing plot-to-track associations using historical plot data stored, for example, in a plot store 62 (FIG. 2), although any suitable reverse time tracking technique can be used. In processing block 96, track stitching may be performed on one or more improved tracks. Generally, track stitching uses track-to-track association to combine multiple track segments into a single, continuous track having a relatively higher quality. Any suitable track stitching technique can be used. The various track enhancement techniques described hereinabove are illustrated in FIGS. 4P-4U and discussed further below in conjunction therewith discussed In some embodiments, the retrodiction module 64 (FIG. 2) is configured to perform the processing of block 90, the reverse time tracking module 66 is configured to perform processing block 92, and the track stitching module 68 is configured to perform processing block 94.

Figure 4D:
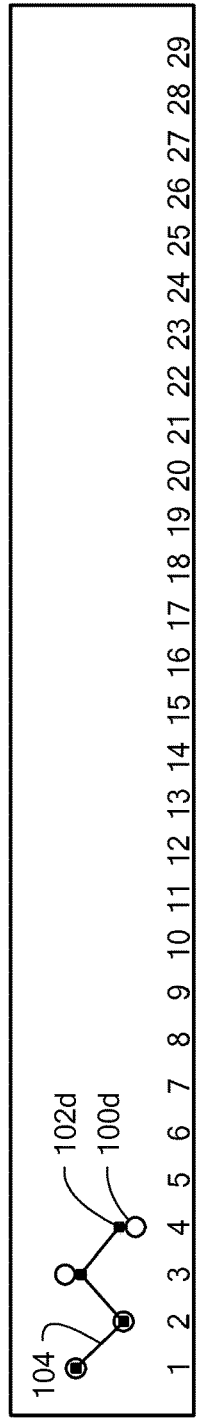
FIGS. 4A-4U are flow diagrams which illustrate the operation of a retrodiction tracker of the type which may be used in the system of FIG. 1 or 2.
Figure 4E:
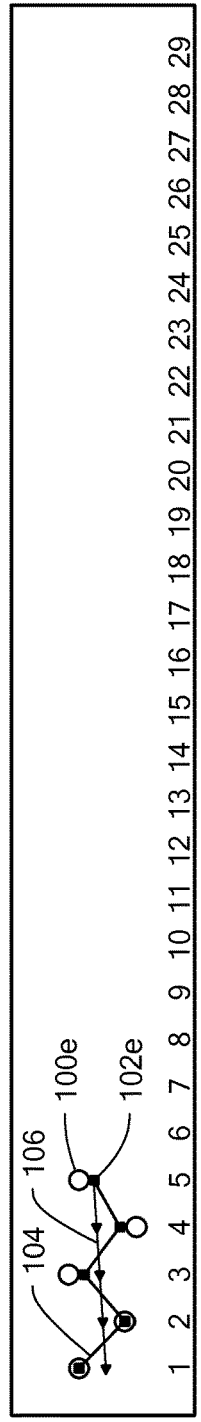
Figure 4F:
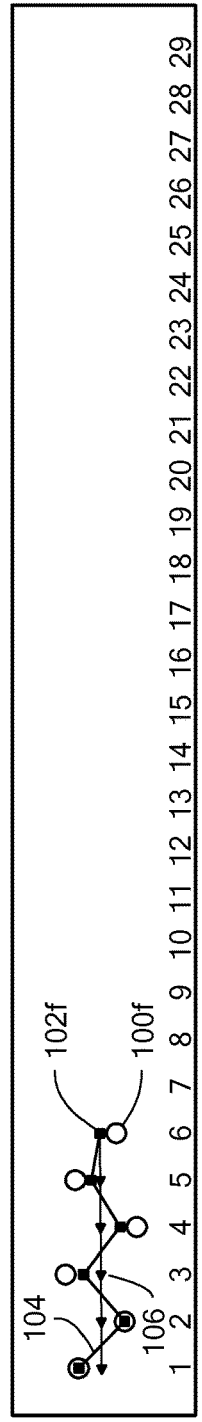
Figure 4G:
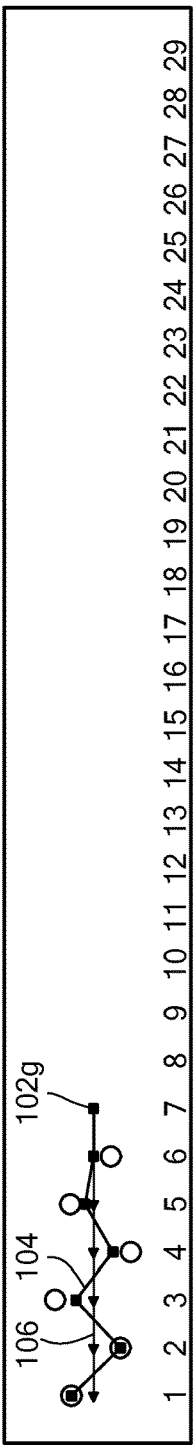
Figure 4H:
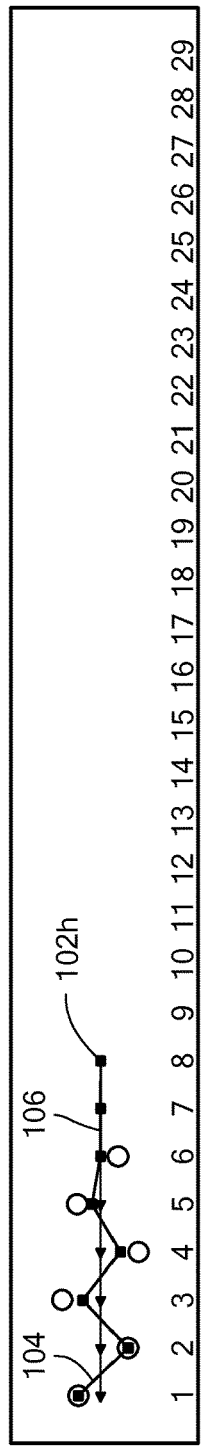
Figure 4I:
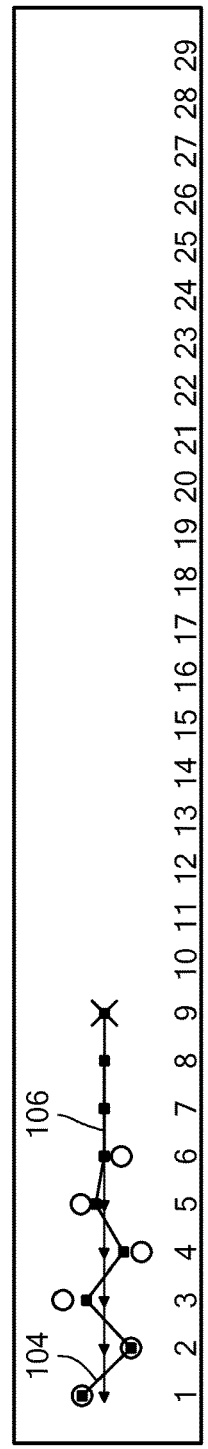
Figure 4J:
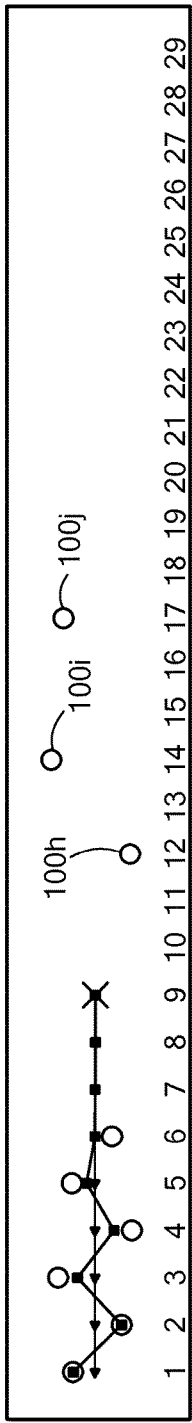
Figure 4K:
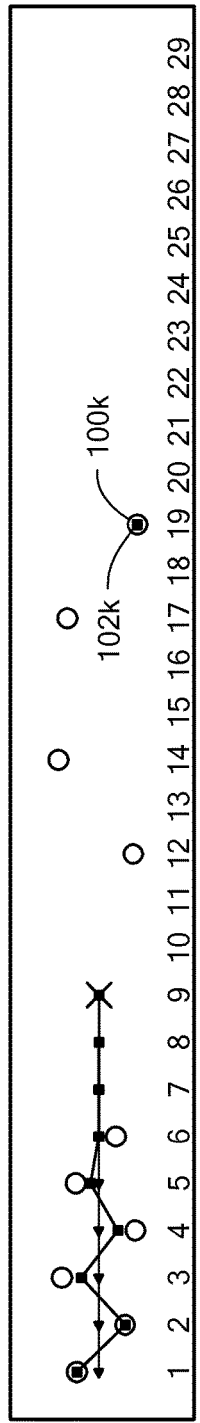
Figure 4L:
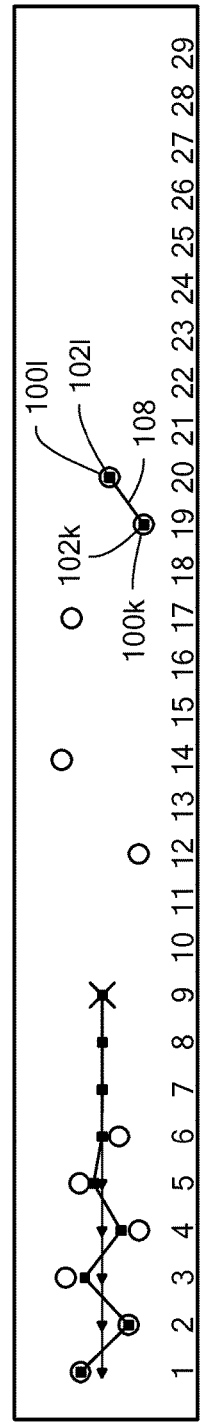
Figure 4M:
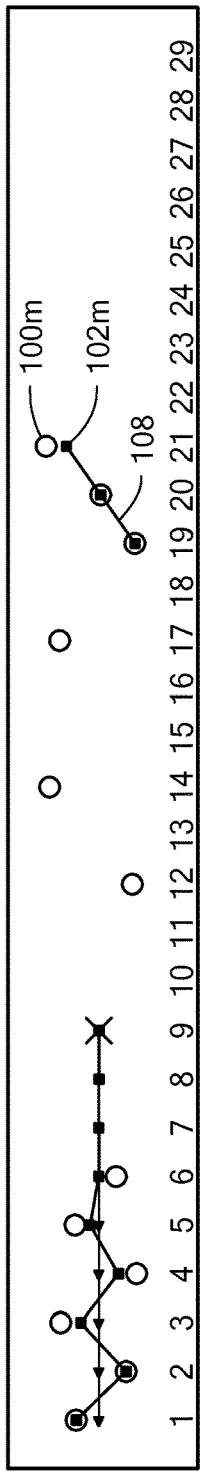
Figure 4N:
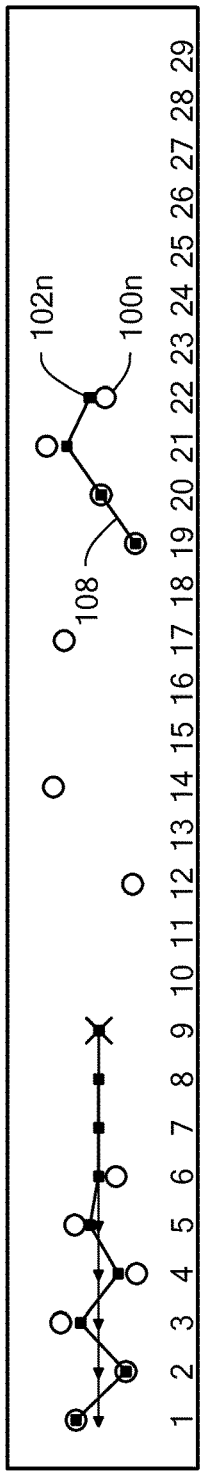
Figure 4O:
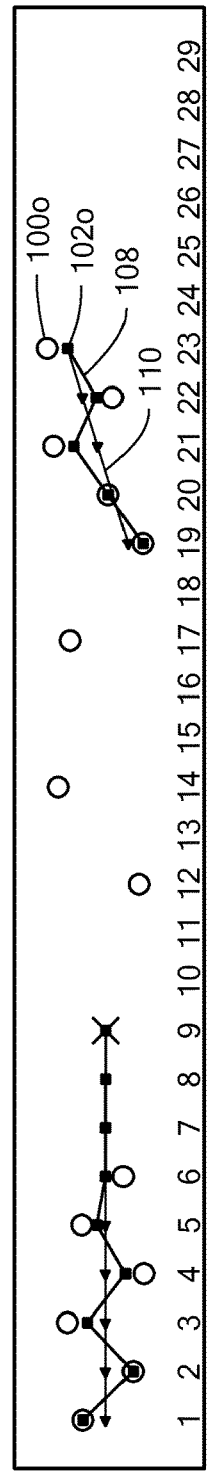
Figure 4P:
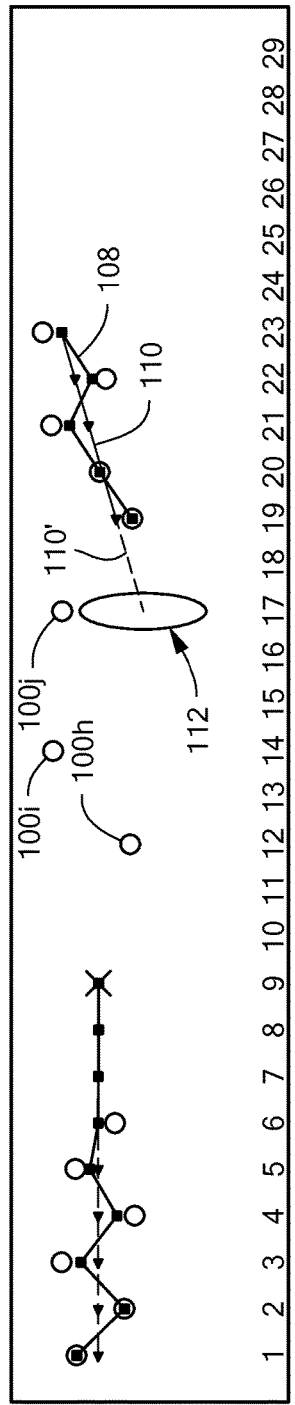
Figure 4Q:
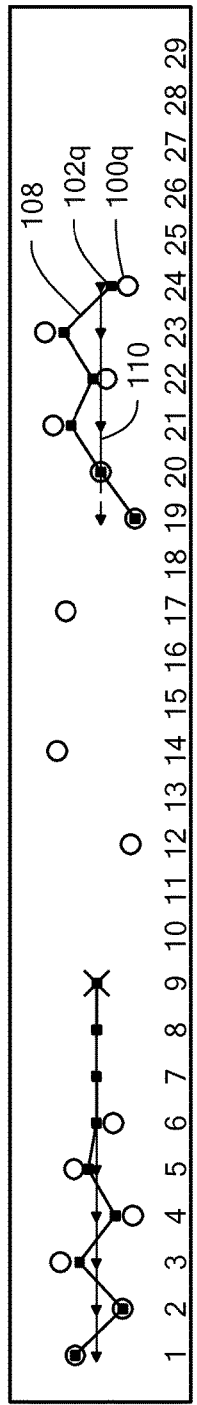
Figure 4R:
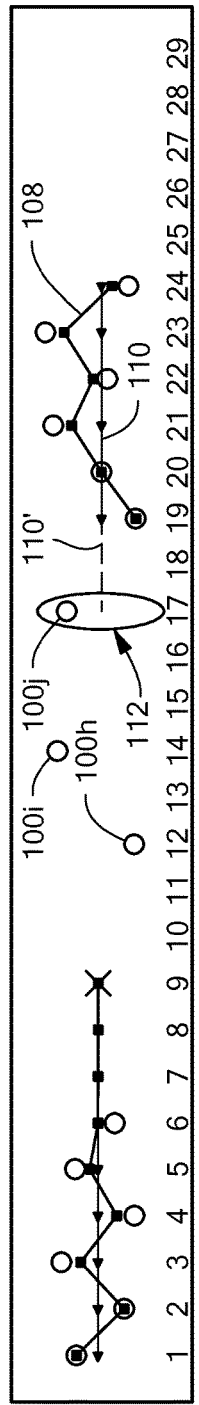
Figure 4S:
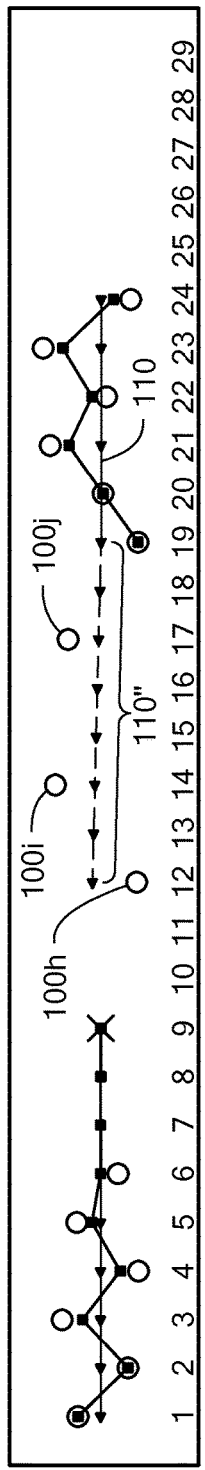
Figure 4T:
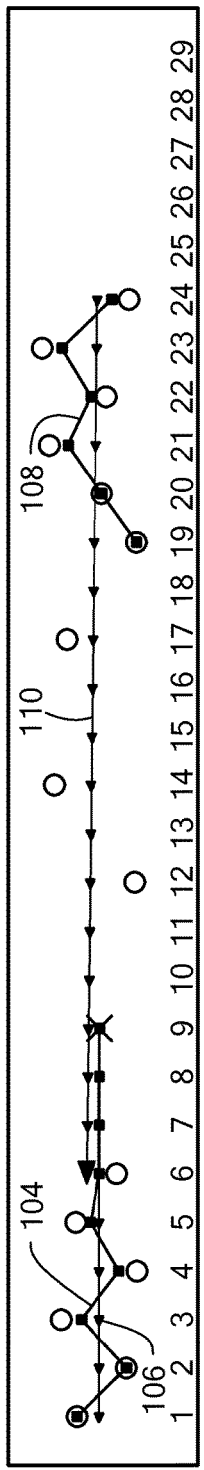
Figure 4U:
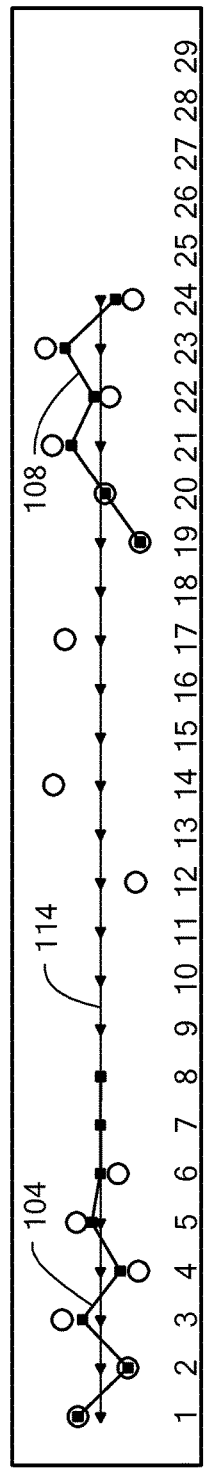

FIGS. 4A-4U are sequence diagrams that illustrate the formation and enhancement of multiple tracks within a retrodiction tracker. Generally, each of the FIGS. 4A-4U show the sequence of track data that has been generated up to a particular time slot (i.e., scan), with the figures generally in increasing time order (although, as discussed below, multiple figures may correspond to the same time slot). Thus, FIG. 4A illustrates the newly generated track data at the first time slot, FIG. 4B illustrates the sequence of track data that has been generated up to the second later time slot, and so forth. In the FIGS. 4A-4U, circular marks (typified by mark 100a in FIG. 4A) correspond to radar plots, whereas square marks (typified by mark 102a in FIG. 4A) correspond to track positions.

In FIG. 4A, the retrodiction tracker processes a first radar plot 100a. In this illustration, the retrodiction tracker has not yet formed any standard or enhanced tracks and, therefore, the plot 100a is not yet associated with any track. In FIG. 4B, the retrodiction tracker associates a second plot 100b with the first plot 100a and forms an initial track 104. The track 104 includes two positions 102a, 102b which are generally coincident with the plots 100a, 100b, respectively (e.g., track smoothing is not performed when a track is provided from two or fewer data points). In FIG. 4C, the tracker associates a third plot 100c with the initial track 104 and determines a third track position 102c using standard or conventional track smoothing techniques known in the art.

In FIG. 4D, the retrodiction tracker associates a fourth plot 100d with the initial track 104. At this time, the track 104 (previously referred to as an initial track) includes sufficient data (i.e., four data points in this particular illustration) such it can be promoted to a confirmed track. In FIG. 4E, the tracker associates a fifth plot 100e with the confirmed track 104 and performs track smoothing to extend the track by position 102e. At this time, the tracker determines the track 104 quality is above a certain threshold, and generates an enhanced track 106 by applying a retrodiction process using any retrodiction technique described hereinabove. The tracker continues to apply the retrodiction process to the confirmed track 104 so long that track's quality exceeds a certain threshold. Thus, in FIG. 4F, the tracker associates a sixth plot 100f with the confirmed track 104, performs track smoothing to determine the new track position 102f, and then applies a retrodiction process to extend and improve the enhanced track 106.

In FIGS. 4G and 4H, no new plot information is available and, therefore, the tracker may use predictive techniques known in the art (sometimes referred to as "track coasting") to extend the track in time. In this illustration, the no detections are observed for two time slots and thus, the tracker may extend the track by two predicted data points 102g and 102h, as shown. In addition, if the track quality remains above a certain threshold, the tracker applies a retrodiction process to extend and improve the enhanced track 106. In FIG. 4I, after a certain number of consecutive time slots with no associations, the tracker "deletes" (e.g., moves the track to the list of deleted tracks) the track 106.

In FIG. 4J, three additional plots 100h, 100i, 100j correspond to detections at three time slots subsequent to FIG. 4I. The plots 100h-100j are generally isolated with respect to each other and, therefore, fail to form a track. In FIGS. 4K and 4L, two additional plots 100k and 100l are associated to form a new initial track 108 (FIG. 4L). The initial track 108 includes track positions 102k and 102l, which correspond to the plots 100k and 100l, respectively. In FIG. 4M, the tracker associates another plot 100m with the initial track 108 and performs track smoothing to extend the track by position 102m. In FIG. 4N, the track associates another plot 100n with the initial track and performs track smoothing to extend the track by position 102n. Because the track 108 (previously referred to as an initial track) includes sufficient data, the tracker promotes it to a confirmed track. In FIG. 4O, the tracker associates another plot 100o with the confirmed track 108 and performs track smoothing to extend the track by position 102o. At this time, the tracker determines the quality of track 108 is above a certain threshold, and generates an enhanced track 110 by applying a retrodiction process.

FIG. 4P illustrates the use of M-of-N criterion (described above in conjunction with FIG. 3A) within the retrodiction tracker to assess the viability of reverse-time tracking. It should be understood that FIGS. 4O and 4P may correspond to the same time slot. In this example, reverse time tracking is only attempted if there is at least M=1 historical association in the N=3 scans immediately preceding the scan corresponding to the track formation (i.e., the scan corresponding to FIG. 4K). Here, the tracker extends the enhanced track 110 back in time (depicted as dashed line 110') using backwards propagation techniques to determine if there is at least M=1 historical association for enhanced track 110' in the N=3 scans immediately preceding the scan corresponding to the track formation. In some embodiments, the tracker uses a historical validation gate (e.g., an ellipse) 112 to determine candidate historical associations. As shown in FIG. 4P, in this example, there is one (1) historical plot (i.e., 100j) in the N=3 scans immediately preceding the scan corresponding to track formation. Because historical plot 100j falls outside of the historical validation gate 112 for enhanced track 110', the M-of-N criterion is not satisfied and thus reverse time tracking is not performed. The tracker may repeat the application of the M-of-N criterion within subsequent time slots, as discussed below.

In FIG. 4Q, the tracker associates another plot 100q with the confirmed track 108 and performs track smoothing to extend the track by position 102q. Because the track 108 remains above a certain threshold, the tracker again applies a retrodiction process to improve enhanced track 110. It should be appreciated that retrodiction substantially improves the estimate at the head of the track, as shown.

FIG. 4R illustrates another use of M-of-N criterion within the retrodiction tracker to assess the viability of reverse-time tracking. It should be understood that FIGS. 4Q and 4R may correspond to the same time slot. As with FIG. 4P, reverse time tracking is attempted if there is at least M=1 historical associations in the N=3 scans immediately preceding the scan corresponding to the track formation (i.e., the scan corresponding to FIG. 4K). Here, the tracker extends the enhanced track 110 back in time (depicted as dashed line 110') using backwards propagation techniques to determine how many of the N=3 preceding historical detections (i.e., plots 100h-100j) can be associated with the enhanced track 110' using historical validation gate 112 to determine historical associations. In this illustration, the tracker makes a historical association with plot 100j and, because the M-of-N criterion is satisfied in the N=3 scans immediately preceding the scan corresponding to the track formation, reverse time tracking is attempted. FIG. 4S illustrates the application of reverse time tracking whereby enhanced track 110 is extended using backwards propagation techniques and historical plot-to-track association. It should be understood that the extended portion of track 110 (depicted as dashed line 110") does not depend on the existence of a previous standard/enhanced track segment, such as deleted track 106. However, reverse time tracking can be combined with track stitching, as discussed next.

FIG. 4T illustrates the progression of reverse time tracking which began in FIG. 4S (thus, FIGS. 4S and 4T may correspond to the same time slot). As shown, as the track 110 is extended back in time, it intersects with deleted track 106. At this point, the tracker performs track stitching to stitch the deleted track 106 with the reverse time track 110. Thus, track stitching preserves the original track 106 and improves track continuity. As illustrated in FIG. 4U, the previously separate tracks 106 and 110 are combined into a single track 114, resulting from the application of retrodiction, reverse time tracking, and track stitching. In some embodiments, track 114 and track 106 are the same track within the retrodiction tracker (i.e., the tracker "undeletes" previously deleted track 106 during track stitching and extends it based on track 110).

While particular embodiments of concepts, systems, circuits and techniques have been shown and described, it will be apparent to those of ordinary skill in the art that various changes and modifications in form and details may be made therein without departing from the spirit and scope of the concepts, systems and techniques described herein. For example, the presented implementation examples show an HF radar system. It will be appreciated, however, that the techniques described herein find application in any tracking system, not just to HF Radar. Other combination or modifications are also possible al of which will be readily apparent to one of ordinary skill in the art after reading the disclosure provided herein.

It is felt, therefore that the concepts, systems, circuits and techniques described herein should not be limited by the above description, but only as defined by the spirit and scope of the following claims which encompass, within their scope, all such changes and modifications.

We claim:

1. In a radar system, a method for tracking an object, the method comprising:
   (a) collecting radar data via a radar receiver of the radar system;
   (b) at a first point in time t=t0, forming a standard radar track for the object from the collected radar data;
   (c) updating the standard radar track over a period of time;
   (d) determining a radar track quality for the standard radar track using a deferred decision tracker wherein the deferred decision tracker employs three levels of track promotion logic with: a first level corresponding to a potential tracks level radar track quality value in which each non-associated single detection is potentially a new track; a second level corresponding to a tentative tracks level radar track quality value corresponding to those tracks classified as tentative until a predetermined number of detections have been associated, and a third level corresponding to a confirmed tracks level radar track quality value corresponding to tracks having a defined number of associated detections;
   (e) in response to a standard radar track achieving a confirmed track level radar track quality value, reprocessing past data based upon current track data by applying a retrodiction process to the data which forms the standard radar track so as to improve the estimate of a future target position, wherein the retrodiction process utilizes information collected from the first point in time t=t0 to a current time t=tc to update at least one of the past estimated data points included in the standard radar track.

2. The method of claim 1 wherein updating the standard radar track comprises filtering the standard radar track using an interacting multiple model (IMM) filter.

3. The method of claim 1 wherein updating the standard radar track comprises:
   receiving a measurement at current scan;
   performing a plot-to-track association; and
   updating the standard radar track.

4. The method of claim 1 wherein applying a retrodiction process to the standard radar track comprises applying a retrodiction filter to the standard radar track data.

5. The method of claim 4 wherein applying a retrodiction filter to the standard radar track comprises applying an interacting multiple model (IMM) retrodiction filter to the standard radar track.

6. The method of claim 1 further comprising extending the standard radar track to a point in time which is earlier than the first point in time t=t0.

7. The method of claim 1 wherein the standard radar track is a first radar track, and the method further comprising combining the first radar track with a second different radar track to form a third different radar track.

8. The method of claim 6 further comprising determining a number of historical plot-to-track associations using information collected between a first earlier point in time ts<t0 to a second earlier point in time ts<te<t0, wherein the radar track is extended back in time if the number of historical plot-to-track associations is greater than or equal to a predefined threshold.

9. The method of claim 1 wherein improving the quality of the standard radar track comprises extending the standard radar track back in time by stitching the standard radar track to past data.

10. The method of claim 1 wherein improving the quality of the standard radar track comprises revising an initial position estimate at time t=t0.

11. A radar system comprising:
   a radar tracking module for tracking a detected target, the radar tracking module comprising:
      a radar track association module configured to associate a measurement with a radar track and generating measurement association statistics for the radar track;

a radar track quality module configured to generate and update a radar track quality value for a radar track based upon a measurement-to-track association likelihood;

a retrodiction module coupled to receive from the radar track quality module one or more radar track quality values for each of one or more radar tracks and in response to the radar track quality values for a given radar track being above a predetermined threshold radar track quality value, applying retrodiction processing to the already formed radar track; and a reverse time tracking module configured to receive a radar track based upon information collected from a first point in time t=t0 to a current time t=tc, and to extend the radar track to an earlier point in time t<t0 to update at least one of the past estimated data points included in the radar track, and to reprocess past data based upon current track data using a retrodiction process; and a deferred decision tracker configured to employ three levels of track promotion logic with: a first level corresponding to a potential tracks level radar track quality value in which each non-associated single detection is potentially a new track; a second level corresponding to a tentative tracks level radar track quality value corresponding to those tracks classified as tentative until a predetermined number of detections have been associated, and a third level corresponding to a confirmed tracks level radar track quality value corresponding to tracks having a defined number of associated detections.

12. The radar system of claim 11 wherein the retrodiction module comprises a retrodiction filter.

13. The radar system of claim 11 wherein the radar tracking module further comprises a radar track smoothing module configured to receive a radar track and an associated measurement and to improve the quality of the radar track using the associated measurement.

14. The radar system of claim 11 wherein the radar tracking module further comprises a radar track maintenance module configured to add a radar track to one of a plurality of radar track lists based upon a corresponding radar track quality.

15. The radar system of claim 11 wherein the radar tracking module further comprises a radar track stitching module to combine a first radar track and a second different radar track to form a third different radar track.

16. A radar system comprising:

hardware configured to transmit radar pulses, receive reflected radar pulses, and process the reflected radar pulses to provide pre-processed radar data;

circuitry configured to process the pre-processed radar data to detect targets and generate plots of the detected targets;

a retrodiction tracking module configured to receive the plots and generate radar tracks belonging to several radar track lists, wherein for a given radar track the retrodiction tracking module is configured to associate a measurement with the radar track and generate measurement association statistics, generate and update a radar track quality value for the radar track, determine which radar track list the track belongs to based upon the radar track quality value and the measurement association statistics of the radar track, and in response to the radar track quality value for a given radar track being above a predetermined threshold radar track quality value, applying retrodiction processing to the radar track; and a reverse time tracking module configured to receive a radar track based upon information collected from a first point in time t=t0 to a current time t=tc, and to extend the radar track to an earlier point in time t<t0 to update at least one of the past estimated data points included in the standard radar track, and to reprocess past data based upon current track data using a retrodiction process; and a deferred decision tracker configured to employ three levels of track promotion logic with: a first level corresponding to a potential tracks level radar track quality value in which each non-associated single detection is potentially a new track; a second level corresponding to a tentative tracks level radar track quality value corresponding to those tracks classified as tentative until a predetermined number of detections have been associated, and a third level corresponding to a confirmed tracks level radar track quality value corresponding to tracks having a defined number of associated detections.

17. The radar system of claim 16 wherein the retrodiction module comprises a retrodiction filter.

18. The radar system of claim 16 further comprising a radar track smoothing module configured to receive a radar track and an associated measurement and to improve the quality of the radar track using the associated measurement.

19. The radar system of claim 16 further comprising a radar track maintenance module configured to add a radar track to one of a plurality of radar track lists based upon a corresponding radar track quality.

20. The radar system of claim 16 further comprising a radar track stitching module to combine a first radar track and a second different radar track to form a third different radar track, wherein the third radar track has improved radar track continuity compared to the first radar track.

* * * * *